United States Patent
Blair et al.

(10) Patent No.: US 6,530,022 B1
(45) Date of Patent: Mar. 4, 2003

(54) PERMISSION-BASED SCANNING OF A WEB SITE

(75) Inventors: Steven Cameron Blair, Austin, TX (US); Sebastian Hassinger, Blanco, TX (US); William Meyer Smith, Austin, TX (US); John Joseph Edward Turek, South Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,908

(22) Filed: Dec. 17, 1998

(51) Int. Cl.[7] .............................. H04L 9/32; G06F 13/00
(52) U.S. Cl. ..................... 713/186; 713/175; 713/200; 713/201
(58) Field of Search .................................. 713/175, 200, 713/201, 168

(56) References Cited

U.S. PATENT DOCUMENTS

| 5,659,616 | A | * | 8/1997 | Sudia | ........................... 380/23 |
| 6,182,227 | B1 | * | 1/2001 | Blair et al. | ................. 713/201 |
| 6,212,634 | B1 | * | 4/2001 | Geer, Jr. et al. | ............ 713/156 |

\* cited by examiner

*Primary Examiner*—Ly V. Hua
(74) *Attorney, Agent, or Firm*—Jeffrey S. LaBaw; Joseph R. Burwell; David H. Judson

(57) ABSTRACT

A scanning tool executing on a host computer may be used to scan a server only if the server (or a proxy) first exposes to the host a certificate that, upon processing by the host, indicates that the server may be scanned. The certificate preferably encrypts a scan permission and is made available from a given port on the server (or the proxy). Whenever the host desires to perform a scan of the server, the host searches the port for the certificate. The certificate is then decrypted to determine whether the scan permission exists. If so, the scan then proceeds, in accordance with any conditions set forth in the decrypted scan permission.

20 Claims, 2 Drawing Sheets

PERMISSION-BASED SCANNING OF A WEB SITE

BACKGROUND OF THE INVENTION

1. Technical Field

The present invention relates generally to client-server computing over the Internet and more particularly to a method to validate approval for a security or diagnostic scan of a target server before the scan takes place.

2. Description of the Related Art

It is commonplace today for computer users to connect their machines to other computers, known as "servers," throughout a network. The network may be a private network, such as a corporate intranet of networked computers that is accessible only to computer users within that corporation, or it may be a public network, such as the Internet. The Internet is a vast collection of computing resources, interconnected as a network, from sites around the world. The World Wide Web (the "Web") is the Internet's multimedia information retrieval system, which is that portion of the Internet that uses the Hypertext Transfer Protocol ("HTTP") as a protocol for exchanging messages. HTTP is an application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML.

A given collection of files located at a Web server is sometimes referred to as a Web site. Site operators often desire to monitor the quality-of-service they provide to users, for example, to address and rectify service problems. Moreover, it is also known in the art to implement Web site diagnostic services whereby a given target server is "scanned" or analyzed to evaluate some given metric. Thus, for example, it may be desired to scan a given server for security vulnerability. A security scan thus might evaluate the server's configuration and identify the various software programs (and their version numbers) supported on the platform. If the security of the server is vulnerable based on some given exposure level criteria, an appropriate report may be generated so that corrective action (e.g., upgrade to a newer software version for a given program) may be taken.

A site operator may also desire to scan its server for reasons or evaluating performance, capacity or other operations. Such a scan may identify any number or type of metric, such as broken links, HTML syntax errors, aggregate file size, number of files, response times, browser incompatibility, and the like.

While security scans may have a valid purpose, they may also be used maliciously. A scan may be used to collect information (e.g., software versions) about the server that might later be helpful in allowing an interloper to bypass system safeguards. Thus, a scan may be used to find a deficiency in the server's security that may be later exploited in a full scale attack directed at the weakness. More likely, a given security scan may be designed to simply make the server so busy that it cannot otherwise service normal requests. Such "denial of service" attacks succeed by diminishing the server's ability to perform its required processing.

Thus, as with many technologies, network scanning tools hold the potential for misuse. A tool that is intended to aid an administrator in securing the Web site may, in the hands of an unscrupulous hacker, be used to find potential weaknesses in security to be later exploited. Purveyors of network scanning tools thus have a significant interest in preventing misuse of such tools so that only authorized scanning of Web sites is allowed.

It is known in the prior art to provide a scanning tool with a license key that allows the tool to be used on only certain IP addresses. While this technique prevents misuse, it is not particularly flexible in that it requires hardcoding of the addresses in the license key. Other proposed methods involve obtaining permission from a third party, usually a vendor of the scanning product, before scanning of a site can take place.

There remains a need to provide a flexible validation method to assure that only authorized scans take place from a given Web site. The present invention addresses this need.

BRIEF SUMMARY OF THE INVENTION

A scanning tool executing on a host computer may be used to scan a server only if the server (or a proxy) first exposes to the host a certificate that, upon processing by the host, indicates that the server may be scanned (and under what conditions). The certificate preferably encrypts a scan permission and is made available from a given port on the server (or the proxy). The identity of the given port may vary. Whenever the host desires to perform a scan of the server, the host searches the port for the certificate. The certificate is then decrypted to determine whether the scan permission exists. If so, the scan then proceeds, preferably in accordance with any conditions set forth in the decrypted scan permission. Thus, according to the invention, the target server must give the host permission to scan in the first instance.

The scan permission typically includes access information that must be used by the host to effect the scan. Otherwise, the nature and scope of the scan permission may be quite variable. The target server may only authorize a given scan at a particular time, or with respect to a particular system, subsystem, resource or program. The scan permission may only be valid over a given time period.

The target server may authorize a trusted third party to act as a proxy to issue the certificate. A trusted third party, for example, is a certifying authority that acts as a broker of certificates on behalf of target servers.

In summary, a primary object of this invention is to control the manner by which a given server scan may be authorized and carried out.

A particular object is to place the ability to grant access to a target server, as well as the time of any such access, in the direct control of the target server administrator.

Yet another related object is to afford a simple method for validating the legitimacy of a security scan or other access request with respect to a target machine operating in an open computer network.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
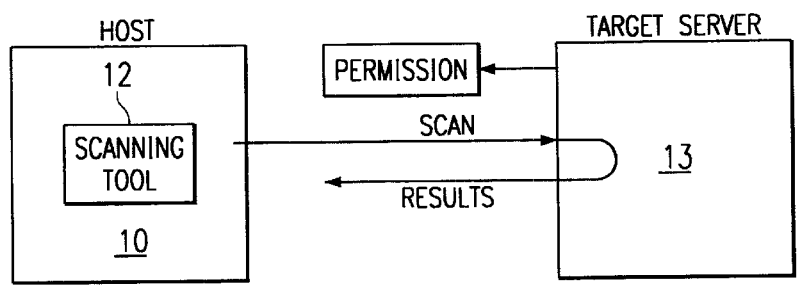
FIG. 1 is a simplified block diagram illustrating a point-to-point scan of a target server using a scanning tool operative on a host computer.

The inventive process is a method and system for authorizing and performing a security or other diagnostic scan of a target server. As used herein, and with reference to FIG. 1, a "security" or "diagnostic" scan typically comprises a point-to-point transaction initiated from a host 10 having a scanning tool 12. The host may be a computer or a process running on a computer. As used herein, "scanning" of the target server means the scan of any system, subsystem, module, resource, program or other discrete entity comprising the target server. The host performing the scan sends and receives information from the target server 13 being scanned. According to the present invention, as will be seen, the target server 13 must give the host permission to scan before the scan is carried out.

Figure 2:
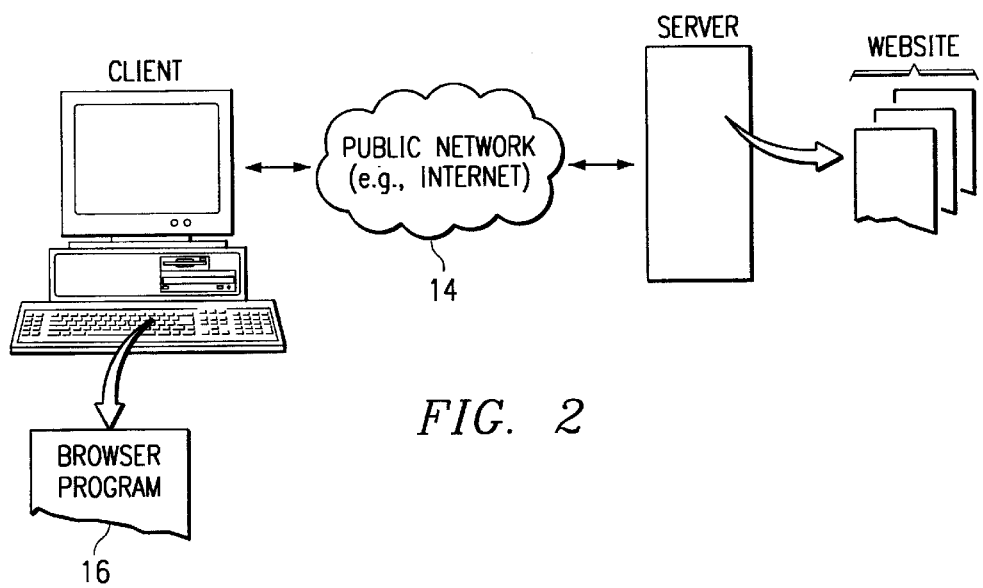
FIG. 2 is a known Internet client-server system in which the present invention is implemented.

By way of brief background, a known Internet-based client-server system is illustrated in FIG. 2. A client machine is connected to a Web server platform via network 14. For illustrative purposes, network 14 is the public Internet, an intranet or some other known network connection. Web server platform is one of a plurality of servers which are accessible by clients, one of which is illustrated by the client machine. A representative client machine includes a browser 16, which is a known software tool used to access the servers of the network. The Web server platform supports files (collectively referred to as a "Web" site) in the form of hypertext documents and objects. In the Internet paradigm, a network path to a server is identified by a so-called URL or "Uniform Resource Locator."

A representative Web client or server is a personal computer or workstation that is x86-, PowerPC®- or RISC-based, that includes an operating system such as IBM® OS/2® or Microsoft Windows NT or 95, and that further includes a browser, such as Netscape Navigator 3.0 (or higher) or Microsoft Internet Explorer 3.0 (or higher). The "host" functionality described below is preferably implemented in software, namely, as a series of computer instructions executable by a processor. Likewise, the target server functionality to be described is also preferably implemented as a computer program.

According to the present invention, it is assumed that a host located in the network desires to scan the Web server or a Web site supported on the server. For example, the site operator may desire to have a third party (namely, the host) monitor the quality-of-service being provide to users. The site operator may be interested in determining whether the server or site has any security vulnerability. The operator may also desire to have the server scanned by the host for reasons of evaluating performance, capacity or other operations. Thus, for example, this type of diagnostic scan may identify broken links, HTML syntax errors, aggregate file size, number of files, response times, browser incompatibility, and the like.

At the same time, the target server operator must be concerned that a third party having a scanning tool cannot obtain access to the server or its resources for illegitimate purposes. The present invention prevents unauthorized access to the target server by requiring that the target server authorize the host to undertake the scan in the first instance. With this safeguard, the host scanning tool cannot be used in an unscrupulous manner, as will be seen.

Figure 3:
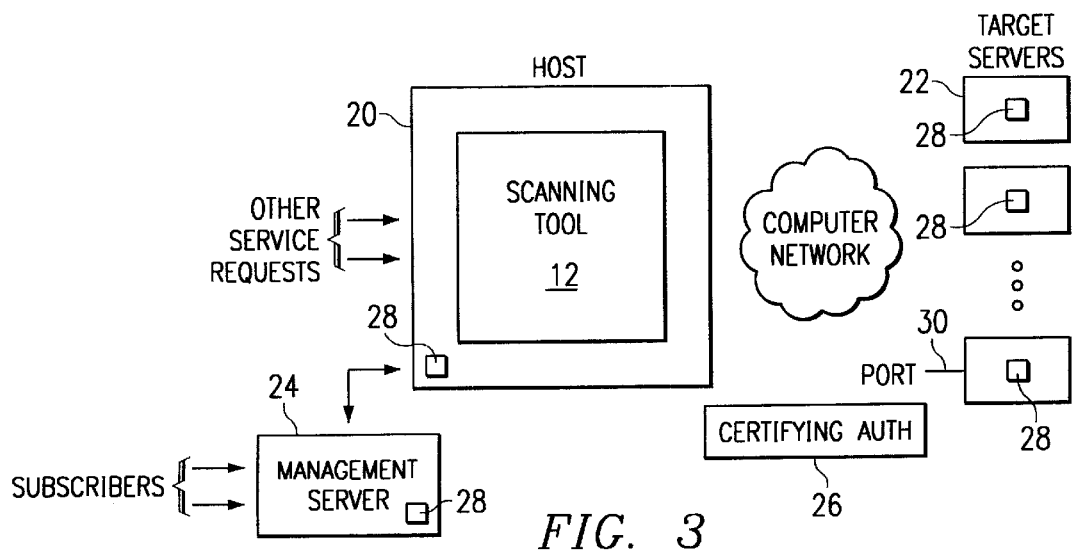
FIG. 3 is a block diagram of one preferred system architecture for the present invention.

FIG. 3 is a representative network architecture in which the permission-based method of the present invention is implemented. As noted above, the actual scan is carried out by a host computer 20 connectable to or otherwise accessible by the various machines in the network. A representative host computer is the IBM Netfinity™ (any model) or PC Server™ (any model) running the lightweight authentication service as an e-business application. For purpose of illustration, it is assumed that the host desires to access one or more target servers 22 to perform a security or diagnostic scan. Alternatively, an access request may be received at the host to effect a scan of a given target server 22. The present invention, however, is not limited to any particular purpose of the access request, as there may be many different types and reasons to access the target machine (any of which may use the inventive permission-based scheme). Thus, the access request may involve a performance analysis, an inventory request, or any other given server interaction request.

Also, the permission-based scheme is shown being illustrated as executing from the separate host computer, but this is not a requirement of the invention. The inventive process may be supported or executed from any machine in the network including the target server itself. Thus, the term "host" is used herein merely for convenience.

The service may be scaled upwards and centrally-managed across any convenient number of host platforms and then controlling those platforms with a management server 24. In addition, target servers may identify a proxy, such as a trusted certifying authority 26, to serve as a broker of scan permission certificates. Target servers thus may subscribe to the certifying authority 26, perhaps for a fee, so that access requests may be processed reliably and efficiently on a relatively large scale basis. The certifying authority 26 also may perform the administrative and management functions of the management server. In either case, it is desirable to store and maintain transaction records generated from access requests. The management server and/or the certifying authority enable the permission-based scanning system to be easily-scaled and centrally-managed if desired. Of course, the present invention may also be effected in a simple point-to-point transaction between a given host and a given target server. In the managed implementation, however, the management server or the certifying authority manage the access requests and resulting transaction records on behalf of one or more users and/or target servers, perhaps for a service fee.

According to the present invention, the host and the target server share a transaction protocol. In particular, each of the provisioned devices of the inventive system (e.g., the host 20, the Web server to be scanned 22 and, optionally, the management server 24 and the certifying authority 26) use a cryptosystem 28 to secure communications across the service. One exemplary cryptosystem is a public key cryptosystem (PKC) that is implemented in software. A public key cryptosystem is useful in providing secure point-to-point communications between the various devices. One of ordinary skill in the art will also appreciate that other techniques may be used to secure this communication channel (such as a private key cryptosystem using a session key, or the like). Alternatively, communications between the devices may not be secured by dedicated encryption software (which, for example, may be the case where the portion of the network is already secure or security is not required). In the preferred embodiment, however, a PKC is used as the software is readily available and easy to use. A representative software PKC product is known in the art as PGP (Pretty Good Privacy), which is available for download over the Internet.

Figure 4:
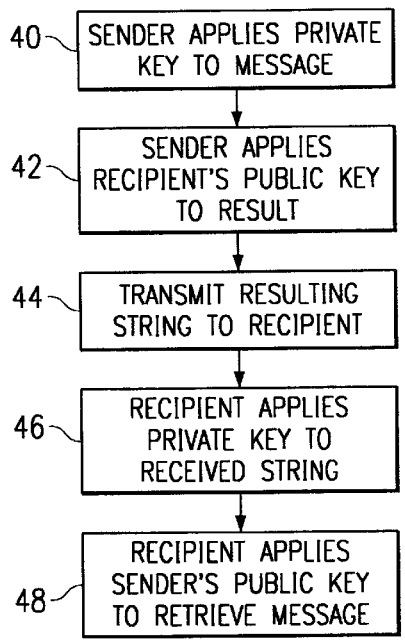
FIG. 4 is a flowchart of a public key cryptosystem for use in the present invention to secure communications between the host and the target server.

As is well-known, a public key cryptosystem enables a pair of parties, each of whom have a public key and a private key "pair", to send and receive messages in a secure fashion. In particular, the sender can verify that only the recipient (and not some third party) gets the message, and the recipient can verify that the sender was the only party who could have sent the message. FIG. 4 illustrates the conventional private key cryptosystem operation. It is assumed that the sender (the first party) desires to send a given message to the recipient (the second party). As used herein, the sender or recipient may be a person, a device, a computer, a computer program, or some process or function. At step 40, the sender applies his private key to the message. At step 42, the sender applies the recipient's public key to the result of step 40. The resulting string is then sent to the recipient at step 44. At step 46, the recipient applies her private key to the received string. Thereafter, at step 48, the recipient decrypts the result by applying the sender's public key to obtain the message. Thus, a known public key cryptosystem of this type facilitates point-to-point secure communications between sender and recipient.

Figure 5:
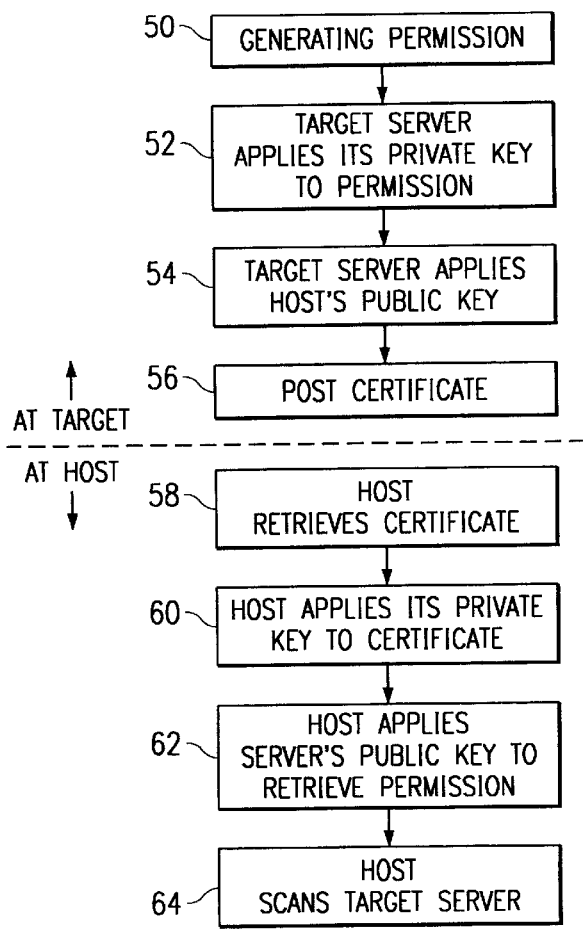
FIG. 5 is a flowchart of a scanning protocol according to the present invention.

With the above as background, the inventive permission-based scheme is now illustrated in the flowchart of FIG. 5. As noted above, each of the host and server processors preferably execute a computer program that, together, provide the permission-based scanning function. The routine begins at step 50 with the target server or the certifying authority (on behalf of the target server) generating a scan permission. In the preferred embodiment, the scan permission is then encrypted to generate a "certificate," which is then, in turn, posted for retrieval by a host desiring to scan the target server. The certificate is generated by first having the target server (or the CA, as the case may be) apply its private key to the scan permission. This is step 52. At step 54, the target server (or the CA) then applies to the resulting string the host computer's public key. The result of this process is the certificate. At step 56, the target server (or the CA) posts the certificate at a given port, for example, port 30 (in FIG. 3). The target server may change the identity of this port on a periodic basis. If so, the target server makes the port identity available to potential hosts.

At step 58, the certificate is picked up, presumably (but not necessarily) by a host computer that desires to obtain permission to scan the target computer. This step may be carried out by having the host computer issue a given access request to the port at which the certificate is posted. Alternatively, the certificate, once posted, may be delivered to the host computer through any conventional means. If the certificate is picked up by an entity without authority, that entity is not able to obtain the scan permission because it cannot remove the outer layer of the encryption. In particular, recall that the certificate preferably is generated by applying the host's public key to a string that includes an encrypted version of the scan permission. Thus, if the entity that picks up the certificate does not possess the private key (that decrypts the host's public key and thus removes the outer layer), the scan permission cannot be obtained.

If, however, the host computer is capable of decrypting the certificate, the routine continues at step 60 by having the host computer apply its private key to the certificate to remove the outer layer of the encryption. This step generates a resulting string. At 62, the host computer applies (to the resulting string) the public key of the target server and thereby obtains the scan permission. At step 64, the host computer undertakes the scan according to the terms and conditions of the scan permission. Further communications between the host and the target server (e.g., a confirmation of the scan, transfer of the scan results, and the like) may also be communicated using a similar PKC transaction protocol.

The scan permission typically includes access information that must be used by the host to effect the scan. Otherwise, the nature and scope of the scan permission is not a limitation of the present invention. The particular permission, of course, depends in the first instance on the type of scan, e.g., security, diagnostic, performance, or the like, being undertaken. The target server may only authorize a given scan at a particular time. The administrator may only authorize a performance scan with respect to a particular system, subsystem, resource or program. The scan permission may only be valid over a given time period. Irrespective of the scan's scope or purpose, the target server operator or administrator is assured that the host has only that authority which the operator or administrator deems appropriate and necessary. If the target server administrator has concerns about a given host's ability to abide by the permission granted, then the administrator need only refrain from generating certificates that include (in the outer layer) the host's public key.

Figure 6:
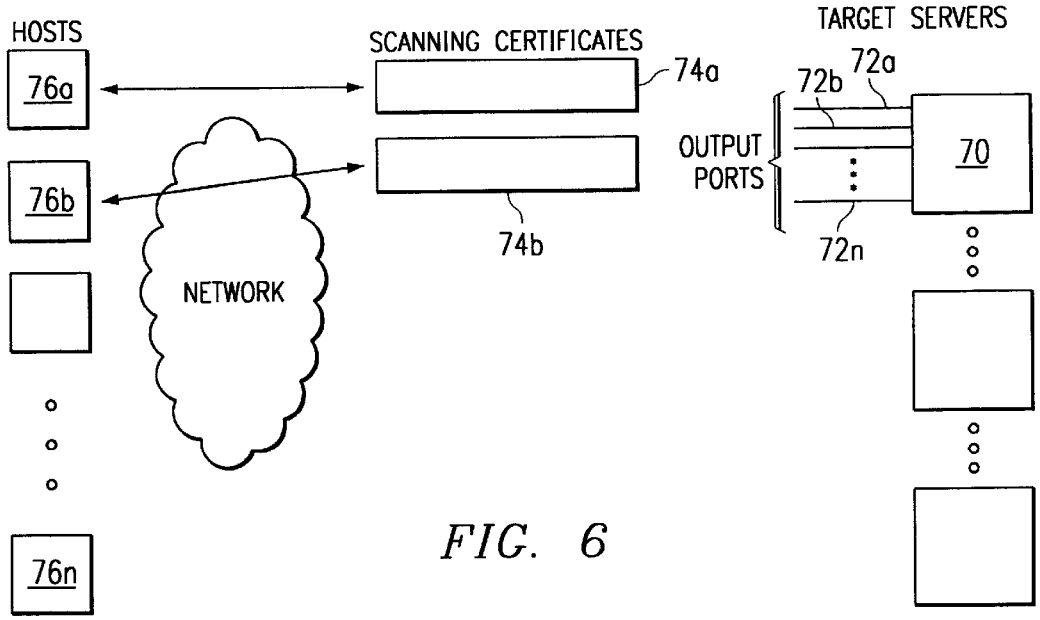
FIG. 6 is an alternate embodiment of the present invention wherein a given target server provides different scan permissions to a set of hosts.

One of ordinary skill in the art will appreciate that a given target server may provide different permissions to different hosts. As seen in FIG. 6, for example, target server 70 has a set of ports 72a–72n at which certificates 74a–74n are posted. By a pre-arranged protocol, host 76a is instructed to pick up its certificate at port 74a, host 76b is instructed to pick up its certificate at port 76b, and so on.

The present invention thus provides a network scanning service that is capable of scanning or otherwise evaluating a given target server (or its resources) but which, preferably, is only available if permission is granted (as evidenced by the posting of a proper certificate) by the server's network administrator or other authorized personnel. A given host seeking to scan the target server must first negotiate for the right to do so; otherwise, the parties will not share an appropriate cryptosystem that will enable the host to undertake the scan. Even if the host has negotiated for the right to obtain a certificate, it must possess a valid key to decrypt the certificate and thereby obtain the ability to perform the scan.

As noted above, a given host that initiates the scan request to the server includes a scanning tool for performing the scan of the target server. The scanner may be based in whole or in part in software, and it may be executed by a processor. A representative scanning tool is the Tivoli Secure Way available from Tivoli Systems, Inc.

The present invention provides numerous advantages over the prior art. The scheme provides a new validation system to solve the problem of validating the legitimacy of a security scan or other access request. It provides a flexible method of assuring that only authorized scans of the server take place. Moreover, the technique eliminates any interaction between the host computer (the operator of the scanning tool) and the scanning tool vendor.

As noted above, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, the term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, the invention may be used or practiced in any type of Internet Protocol (IP) client, not just within an HTTP-complaint client having a Web browser. Thus, as used herein, references to "browser" should be broadly construed to cover an IP client.

The present invention has been described in the context of a scan request to the target server received from a source in the computer network. The present invention, however, provides a robust validation mechanism that is not limited merely to providing before-the-fact authorization with respect to scan requests. Indeed, the inventive technique of posting a certificate that encrypts a given permission may be used for any given request from the unknown source to interact with the target server.

Having thus described our invention, what we claim as new and desire to secure by letters patent is set forth in the following claims:

What is claimed is:

1. A method of scanning a target server in a computer network from a host having a scanning tool, comprising the steps of:

posting a certificate at a given port of the target server, wherein the certificate, upon given processing, reveals a scan permission;

directing the host to obtain the certificate from the given port;

at the host, processing the certificate to reveal the scan permission; and scanning the target server according to the scan permission.

2. The method as described in claim 1 wherein the host and the target server share a public key cryptosystem.

3. The method as described in claim 2 wherein the certificate is generated by:

applying the target server's private key to the scan permission to generate a first string; and applying the host's private key to the first string.

4. The method as described in claim 3 wherein the step of processing the certificate to reveal the scan permission includes:

applying the host's private key to the certificate to generate a third string; and applying the target server's public key to the third string.

5. The method as described in claim 1 wherein the scan permission includes access information that must be used by the host to carry out the scan.

6. The method as described in claim 1 wherein the scan is a security scan.

7. The method as described in claim 1 wherein the scan is a diagnostic scan.

8. The method as described in claim 1 wherein the computer network is the Internet and the target server includes a Web site.

9. A method of scanning a target server in a computer network from a host having a scanning tool, comprising the steps of:

generating a certificate that, upon processing, reveals a scan permission;

posting the certificate at a given location;

directing the host to obtain the certificate from the given location;

at the host, processing the certificate to reveal the scan permission; and scanning the target server according to the scan permission.

10. The method as described in claim 9 wherein the given location is a port of the target server.

11. The method as described in claim 9 wherein the given location is a port of a proxy that posts the certificate on the target server's behalf.

12. The method as described in claim 9 wherein the host and the target server share a public key cryptosystem.

13. The method as described in claim 12 wherein the certificate is generated by:

applying the target server's private key to the scan permission to generate a first string; and applying the host's private key to the first string.

14. The method as described in claim 13 wherein the step of processing the certificate to reveal the scan permission includes:

applying the host's private key to the certificate to generate a third string; and applying the target server's public key to the third string.

15. A server, comprising:

a processor;

an output port;

means for generating a certificate that, upon given processing, reveals a scan permission;

means for posting the certificate on the output port; and means responsive to receipt of the scan permission for authorizing a scan.

16. The server as described in claim 15 wherein the means for generating the certificate includes a cryptosystem.

17. A host, comprising:

a processor;

means for processing a certificate retrieved from a given target server to reveal a scan permission;

means for issuing a scan request to the target server according to the scan permission; and means for scanning the target server.

18. The host as described in claim 17 wherein the means for processing the certificate includes a cryptosystem.

19. A computer program product in a computer-readable medium for use in a server connectable in a computer network, comprising:

means for generating a certificate that, upon given processing, reveals a scan permission;

means for posting the certificate on a given port of the server; and means responsive to receipt of the scan permission for authorizing a scan.

20. A computer program product in a computer-readable medium for use in a host connectable to a target server in a computer network, comprising:

means for processing a certificate retrieved from the target server to reveal a scan permission;

means for issuing a scan request to the target server according to the scan permission; and means for scanning the target server.

* * * * *